(12) United States Patent
Osama et al.

(10) Patent No.: US 6,198,803 B1
(45) Date of Patent: Mar. 6, 2001

(54) BEARING ASSEMBLY INCLUDING ROTATING ELEMENT AND MAGNETIC BEARINGS

(75) Inventors: Mohamed Osama; Gerald Burt Kliman; Neil Richard Garrigan, all of Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/378,155

(22) Filed: Aug. 20, 1999

(51) Int. Cl.[7] .................................................. H01J 35/10
(52) U.S. Cl. ........................................... 378/132; 378/125
(58) Field of Search .................................... 378/132, 131, 378/125, 144; 250/406, 402

(56) References Cited

U.S. PATENT DOCUMENTS

| | | | |
|---|---|---|---|
| 4,040,681 | * 8/1977 | Van der Heide | 378/132 |
| 4,167,671 | * 9/1979 | Boden et al. | 378/132 |
| 4,322,624 | 3/1982 | Cornelissen et al. . | |
| 4,468,801 | 8/1984 | Sudo et al. . | |
| 4,628,522 | 12/1986 | Ebersberger . | |
| 4,658,414 | 4/1987 | Geldner . | |
| 4,677,651 | 6/1987 | Hartl et al. . | |
| 4,679,220 | * 7/1987 | Ono | 378/132 |
| 4,891,832 | 1/1990 | Ebersberger . | |
| 5,010,563 | * 4/1991 | Laurent et al. | 378/132 |
| 5,117,448 | 5/1992 | Penato et al. . | |
| 5,490,198 | 2/1996 | Gerling . | |
| 5,729,066 | 3/1998 | Soong et al. . | |

FOREIGN PATENT DOCUMENTS

| | | |
|---|---|---|
| 0709946B1 | 10/1996 | (EP) . |
| 58-186144 | 10/1983 | (JP) . |
| 58-186145 | 10/1983 | (JP) . |

OTHER PUBLICATIONS

Trinity Flywheel Power—Flywheel Technology, Internet Web Page @ http://www.trinityflywheel.com/fllytech.htm, 1999, pp. 1–3.

Me Bowler, Flywheel Energy Systems: Current Status and Future Prospects:, Magnetic Material Producers Association Joint Users Conference, 1997, pp. 1–9.

G. Schweitzer, et al, Active Magnetic Bearings: Basics, Properties, and Applications of Active Magnetic Bearings, Components in Magnet Bearing Systems: Magnetic Force, 1994, Chap. 3, pp. 66–69; Chap. 3.7, pp. 88–93, Chap. 4, pp. 100–109.

Da Weise, et al, "Magnetic Bearings Attract Attention", Power Transmission Design, Oct. 1985, pp. 21–23.

Ja Kirk et al, "Performance of a Magnetically Suspended Flywheel Energy Storage System", Fourth International Symposium Magnetic Bearings, Aug. 1994, pp. 547–552.

* cited by examiner

*Primary Examiner*—David P. Porta
*Assistant Examiner*—Irakli Kiknadze
(74) *Attorney, Agent, or Firm*—Ann M. Agosti; Jill M. Breedlove

(57) ABSTRACT

A bearing assembly includes: an axial rotatable structure including a cylindrical rotor assembly (including a motor rotor and a plurality of magnetic bearing rotors); a cylindrical stationary shaft; rotating element bearings mechanically coupling the rotatable structure and the stationary shaft; and a cylindrical stator assembly including a motor stator and a plurality of magnetic bearing stators. The magnetic bearing stators and the magnetic bearing rotors forming magnetic bearings magnetically coupling the rotor and stator assemblies. Command feedforward of electrical current can be provided to at least some of the bearings to achieve appropriate radial forces for respective operating trajectories.

31 Claims, 6 Drawing Sheets

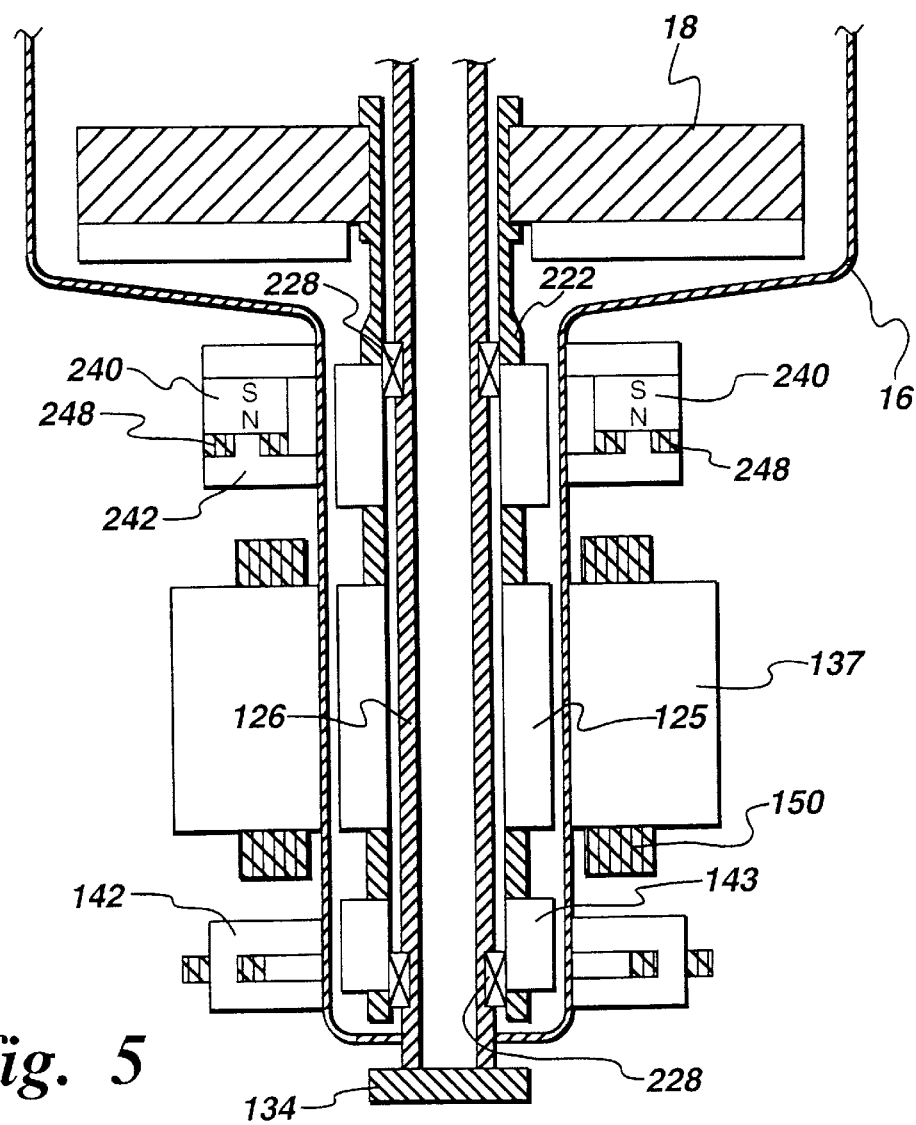
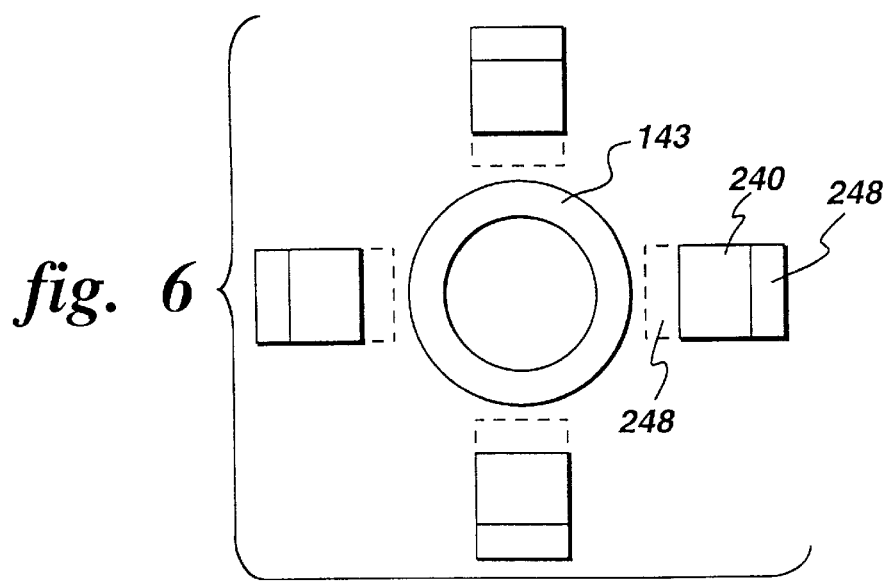

BEARING ASSEMBLY INCLUDING ROTATING ELEMENT AND MAGNETIC BEARINGS

BACKGROUND OF THE INVENTION

The present invention relates generally to bearing assemblies and more specifically to bearing assemblies which are particularly useful in X-Ray tubes.

In an X-ray tube, electrons are produced at a cathode by heating a filament. The electrons are attracted to an anode target by a high voltage potential difference (typically about forty to one hundred fifty kilovolts). When the accelerated electrons hit the anode target, X-rays are produced. Only about one percent of the electron energy is converted into X-ray radiation. The remaining energy is converted into heat. To avoid exceeding the melting point of the focal spot on the target where electrons hit, the target is rotated. The higher the target speed, the lower the focal spot temperature.

To avoid scattering the electron beam, the cathode and anode are kept in vacuum conditions (typically about $5 \times 10^{-7}$ Torr). As a result, a mechanical bearing can not be effectively supplied with oil or grease lubrication. In addition, heat generated by the interaction of the high speed electrons from the cathode with the anode target results in the operating temperature of the bearings being in the three hundred to four hundred fifty degrees centigrade range. Due to the vacuum environment and the high operating temperature, a pure, solid silver coating is usually used as a bearing lubricant. The increase of friction due to lack of liquid lubricant results in extra noise, vibration, and wear, and shortens bearing lifetime. Furthermore, the silver coated bearings have limited the speed of the anode to about ten thousand rotations per minute.

Increasing the target speed beyond ten thousand rotations per minute would provide two major advantages: (1) permitting an increase of the tube electron current (and hence the tube power) without exceeding the focal spot temperature limit; and (2) permitting an increase of the assembly temperature for the same focal spot temperature and thus increasing the number of exposures during exams or the number of patients that can be examined during a given time period.

Active magnetic bearings have been proposed for reducing noise, vibration and wear of ball bearings and for increasing X-ray tube speeds. As one example, Cornelissen et al., U.S. Pat. No. 4,322,624, describes several axial magnetic bearings situated about the anode target axial shaft. The position of the shaft is sensed with a transducer during operation. Transducers can create unreliability and can add to the complexity of associated control logic and drive systems. Another limitation with these embodiments is that designing a contact for the current path is difficult.

In some magnetic bearing assemblies, such as shown by Kirk et al., "Performance of a Magnetically Suspended Flywheel Energy Storage System," Fourth International Symposium on Magnetic Bearings, August 1994, ETH Zurich, pp. 547–552, mechanical bearings are used for touchdown purposes or as back up bearings in the event that a magnetic bearing fails. These embodiments include a touchdown gap (typically about 0.1 mm) between the backup mechanical bearings and the rotor or stator. Consequently, the rotor can be displaced with respect to the stator, and closed loop, feedback position control must be used.

BRIEF SUMMARY OF THE INVENTION

Thus, there is a need to extend the speed of X-ray tube anodes in an efficient and reliable manner. In one embodiment of the present invention, rotating element bearings are used in combination with radial magnetic bearings. The magnetic bearings relieve the weight of the anode and compensate for additional forces that can result from an operating trajectory of the X-ray tube. Rotating element bearings are used for providing a return path for electron beam current and for contributing to the provision of axial support and geometric control. Because the rotating element bearings mechanically couple (that is, are in direct mechanical contact with) the rotating and stationary portions of the assembly, a touchdown gap is not present and rotating and stationary portions do not experience relative displacement and do not require feedback position control.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIG. 5 is a sectional side view of an X-ray tube bearing assembly according to an example interior rotor/outer rotation embodiment of the present invention.

FIG. 6 is a sectional view taken along line A—A of FIG. 5.

DETAILED DESCRIPTION OF THE INVENTION

Figure 1:
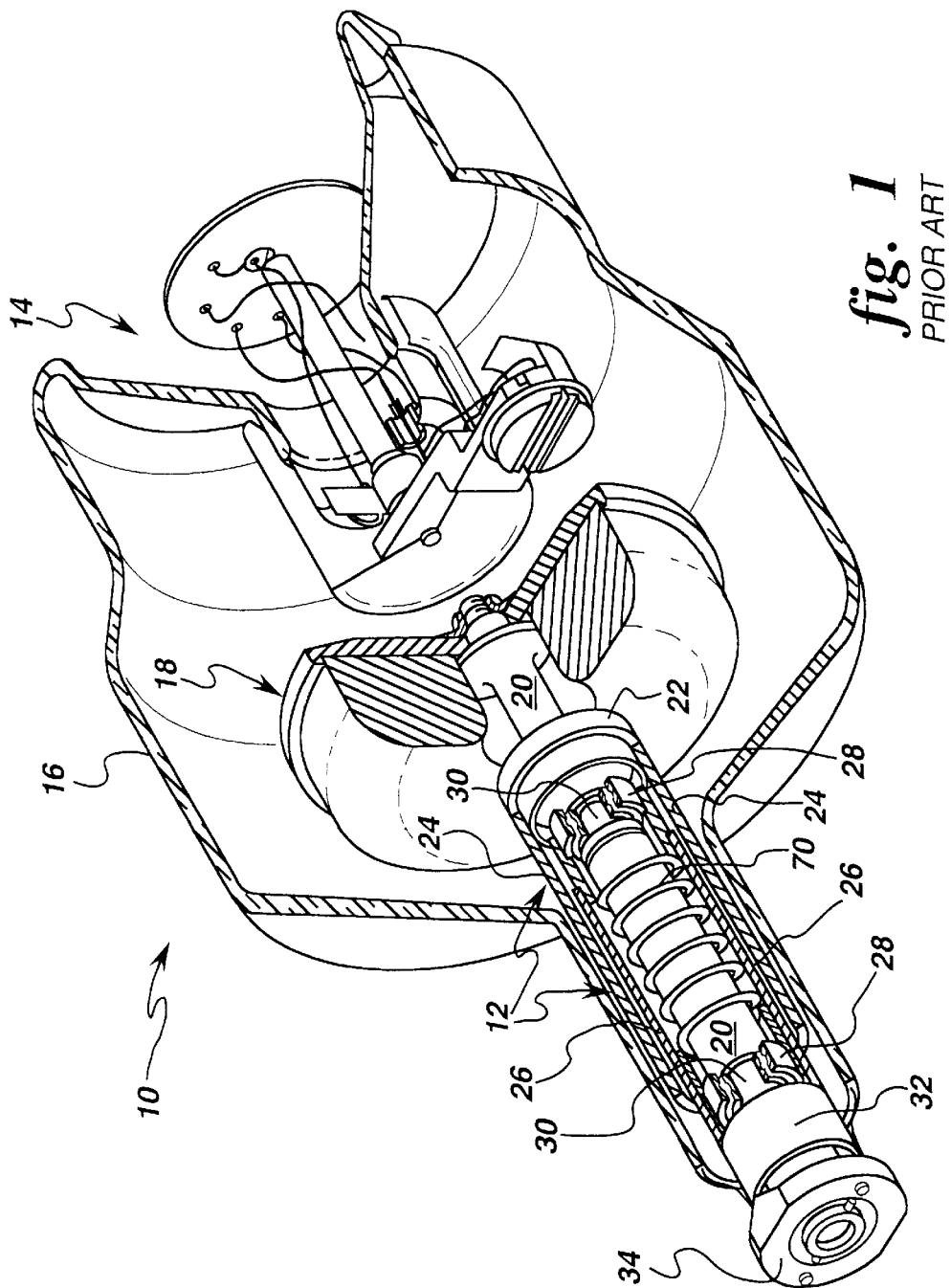
FIG. 1 is a perspective view of a conventional X-ray tube anode and cathode assembly.

FIG. 1 is a perspective view of a conventional X-ray tube 10 including an anode assembly 12 and a cathode assembly 14 enclosed within a frame 16. Anode assembly 16 includes an anode target 18, a rotatable shaft 20, a rotor hub 22 attaching a rotor 24 to the rotatable shaft, a stationary shaft 26 (sometimes referred to as a "stem"), rotating element bearings 28 situated in rotor shaft grooves 30, and a stem ring 32 connecting stationary shaft 26 to a connector 34 which transfers electrical current from the stationary shaft.

Figure 2:
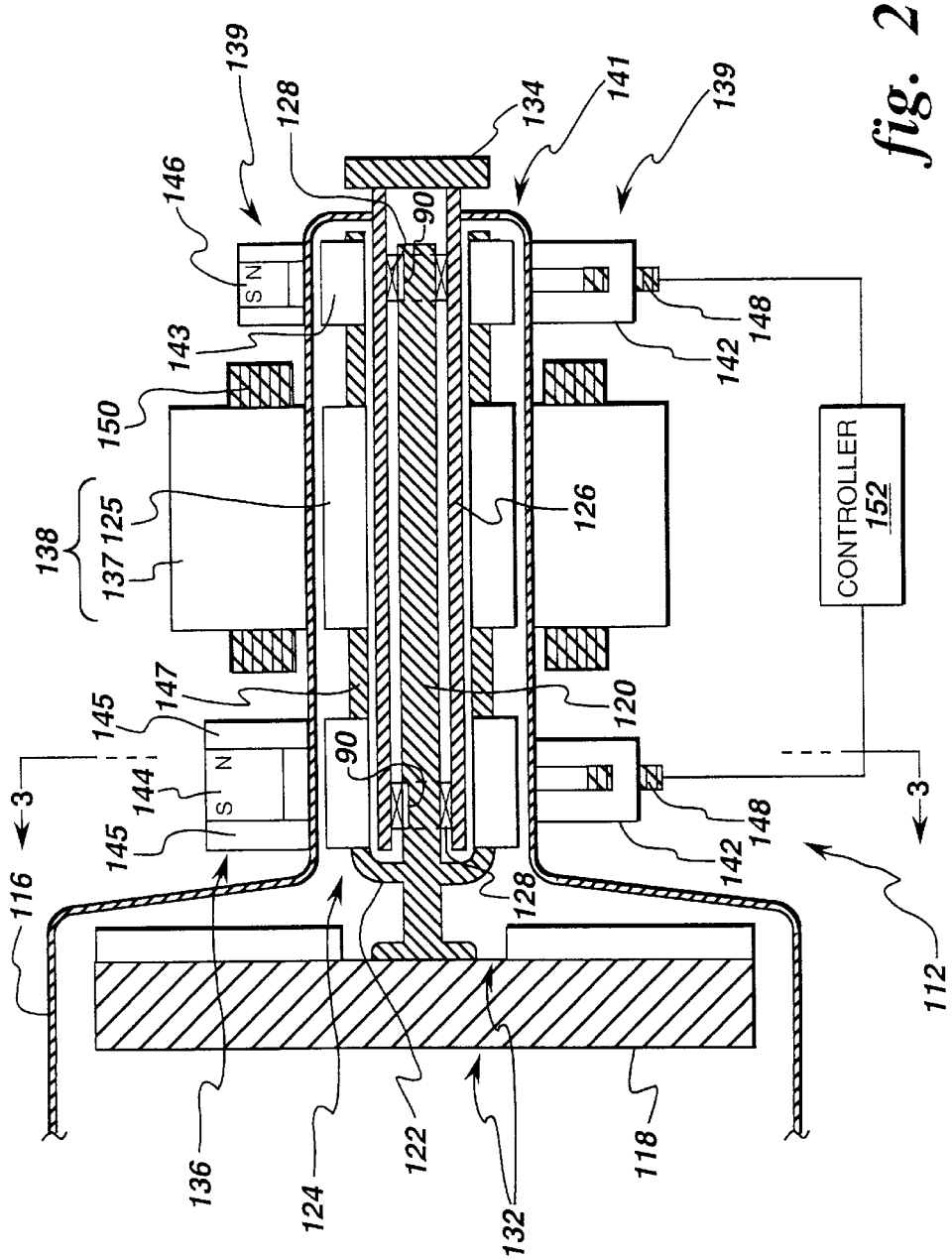
FIG. 2 is a sectional side view of an X-ray tube bearing assembly according to an example interior rotor/inner rotation embodiment of the present invention.
Figure 3:
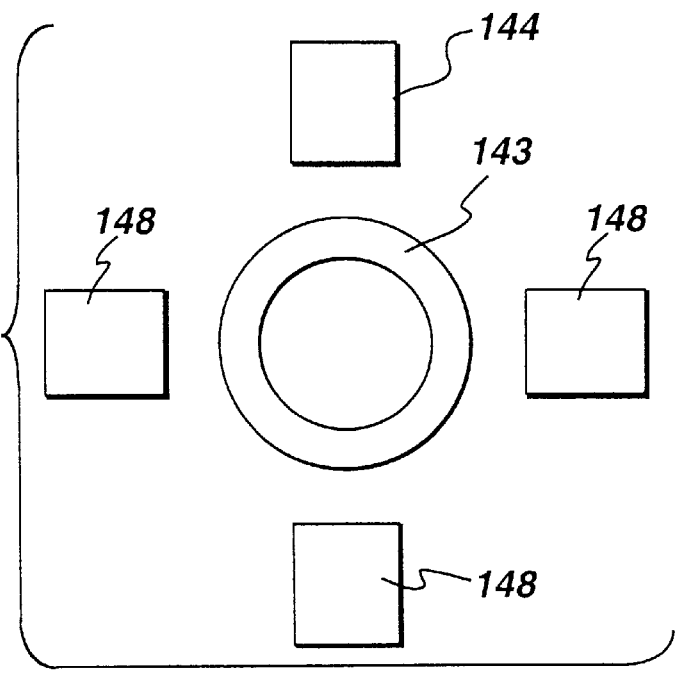
FIGS. 3–4 are sectional views taken along line A—A of FIG. 2.
Figure 4:
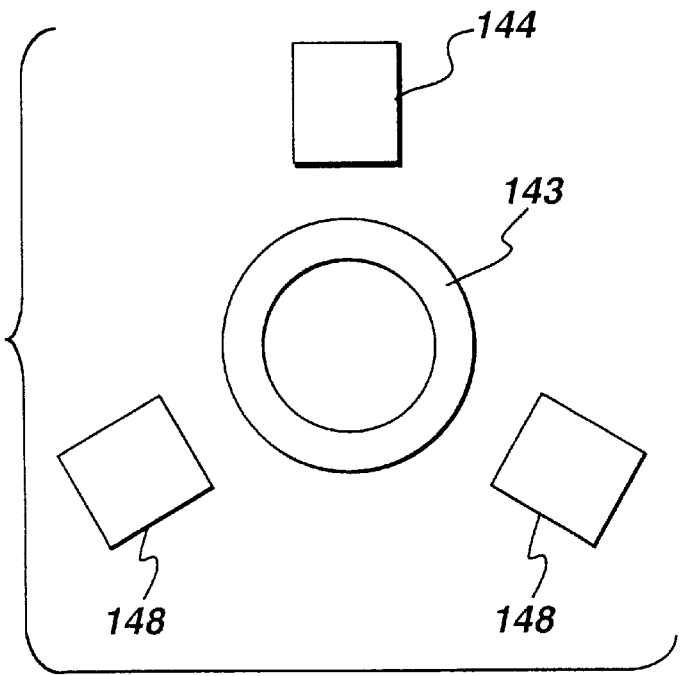

FIG. 2 is a sectional side view of an X-ray tube bearing assembly according to an example interior rotor/inner rotation embodiment of the present invention, and FIGS. 3–4 are sectional views taken along line A—A of FIG. 2.

In the embodiment of FIG. 2 (as well as in the alternative embodiments of FIGS. 5 and 7), an X-ray tube bearing assembly includes: an axial rotatable structure 123 including an anode target 118 and a cylindrical rotor assembly 124, the cylindrical rotor assembly including a motor rotor 125 and a plurality of magnetic bearing rotors 143; a cylindrical stationary shaft 126 (more commonly referred to as a "stem"); rotating element bearings 128 mechanically coupling the rotatable structure and the stationary shaft; and a cylindrical stator assembly 136 including a motor stator 137 and a plurality of magnetic bearing stators 139, with the magnetic bearing stators and the magnetic bearing rotors forming magnetic bearings 141 magnetically coupling the rotor and stator assemblies. Magnetic bearings 141 generate radial magnet force (as well as optionally additionally generating axial magnetic force). Rotating element bearings 128 may comprise bearings including spherical or cylindrical elements, for example, which are typically coated with a solid lubricant such as silver.

In the embodiment of FIG. 2 (as well as in the embodiment of FIG. 7), the rotatable structure includes a rotatable shaft 120 with the anode target 118 and the rotor assembly 124 attached thereto and the rotor assembly extending around a portion of the rotatable shaft. In the inner rotation embodiments, stationary shaft 126 is situated between the rotatable shaft and the rotor assembly, and the rotating element bearings 128 mechanically couple the rotatable shaft and the stationary shaft. In one embodiment the rotatable and stationary shafts comprise steel or copper, for example. If the motor rotor and the motor stator are at the same electric potential, in one embodiment, the radial clearance between the stator assembly and the rotor assembly ranges from about one to about five millimeters. If there is a difference in electrical potential (typically in the range of about forty kilovolts to about one hundred fifty kilovolts), then, in one embodiment to maintain voltage insulation, the radial clearance ranges from about five to about twenty millimeters.

In the interior rotor/inner rotation embodiment of FIG. 2, the stator assembly 136 extends around at least a portion of the rotor assembly, and an X-ray tube frame 116 is situated between the stator and rotor assemblies. The stator assembly can be mounted on the X-ray tube frame. The frame typically comprises a glass, metal, or metal-ceramic material capable maintaining high voltage insulation between the cathode and the anode (FIG. 1). The thickness of the frame typically varies from about 0.2 to about 2 millimeters. Example outer diameters of the stator assembly and rotor assembly are, respectively, about 50 to about 250 millimeters and about 25 to about 125 millimeters.

Motor stator 137 may comprise a conventional three phase wound stator including windings 150. To fit into a conventional X-ray tube frame and allow for space to position the magnetic bearings, motor stator 137 and motor rotor 125 may be formed to have shorter lengths than conventional X-ray tube motors. Motor rotor 125 may comprise a permanent magnet rotor, a squirrel cage rotor or a sheet-rotor structure. In one embodiment, the rotor comprises a solid material instead of rotor laminations.

In one embodiment, as shown in FIG. 2, rotating element bearings 128 and magnetic bearings 141 are each situated on opposing ends of the motor rotor and the motor stator to provide distributed support for rotatable structure 123.

The magnetic bearing rotors may comprise at least two magnetic cylinders 143 situated on opposing ends of the motor rotor, and, in one embodiment, the magnetic bearing rotors comprise solid iron rings having a minimized thickness that is sufficient to avoid excessive magnetic flux saturation in the rings. Using a solid material for the magnetic bearing rotors and the motor rotor helps the rotors to withstand high temperatures and high speed X-ray tube operations. Laminated rotors can alternatively be used and may be more suitable in certain embodiments. Magnetic bearing rotors 143 and motor rotor 135 may be joined by any structurally appropriate rotor assembly support 147. In one embodiment, rotor assembly support 147 comprises a mechanical connection of the motor rotor to the magnetic bearing rotors and includes a material such as steel or copper, for example. The magnetic bearing rotors may have axial lengths substantially equivalent to axial lengths of respective magnetic bearing stators.

Although two magnetic bearing stators are shown, additional magnetic bearing stators can be included if desired. In one embodiment, at least one of the magnetic bearing stators includes a permanent magnet 140, and each of the magnetic bearing stators includes at least two electromagnets 142 having electromagnetic windings 150. Two magnetic bearing stators are situated on an opposing end of the motor stator. One or more permanent magnets may be situated on opposing ends of the motor stator (shown in FIG. 2) or between the anode target and the motor stator (shown in FIG. 7).

The permanent magnets are passive components whereas the electromagnets are active components. Using both passive and active components minimizes the electrical energy required for magnetic levitation. In one embodiment, the material of the permanent magnets comprises a rare-earth material that is thermally stable such as Samarium-Cobalt, for example. As compared with ferrite materials, rare-earth magnets have higher energy densities (leading to smaller sizes) and higher coercivities that resist demagnetization due to the presence of electromagnets.

The permanent magnets can be designed to provide a vertical force substantially equal to the dead weight of the anode. Alternatively, the permanent magnets can be designed to contribute a different vertical force that optimizes the overall system performance according to a desired objective function. Because additional weight is present on the anode target side of the stator motor, it is useful for a front permanent magnet 144 to be larger than a rear permanent magnet 146. To reduce reluctance of the resulting magnetic circuit and direct the flux paths, ferromagnetic slabs 145 can be positioned around each permanent magnet.

Electromagnets 142 may comprise a ferromagnetic material such as iron, for example, which provides a path for electrical flux created by electromagnetic windings 148. Because the main electrical flux in the rotor assembly is fixed, solid electromagnets are more economical than laminated electromagnets, for example. The electromagnets, when energized through electromagnet windings 150 can produce radial forces to counteract extra radial forces acting on the bearings that result from the X-ray tube's motion. Since the X-ray tube operating trajectory for each exposure is known in advance, the bearing assembly can use command feedforward to obtain sufficiently accurate control forces and need not rely on feedback control loops or sensors.

Conventional magnetic bearing controllers use closed loop position feedback control and feedback sensors. Closed loop feedback is subject to stability complications and must be tuned to provide a stable response. Additionally, it is necessary for feedback sensors (such as position sensors) to be used to measure the position of the supported structure which is then compared with the commanded position in the closed loop control. This type of feedback control requires control algorithms and the associated complex hardware and/or software.

According to one embodiment of the invention, a controller 152 (such as a computer, a processor, or a microprocessor, for example) can be used for providing command feedforward of electrical current in the electromagnetic windings to achieve appropriate radial forces for respective X-ray tube operating trajectories. Command feedforward can be used because, in the present invention, the rotating element bearings mechanically couple (are in direct contact with) the rotatable structure and the stationary shaft and thus no displacement occurs between the rotatable structure and the stationary shaft or the stator assembly. Command feedforward does not employ closed loop control and hence does not require feedback sensors. Command feedforward pre-calculates the magnetic bearing current commands a priori from the known trajectory kinematics and from estimates of the system parameters. Specifically, the force required for static and dynamic support of the rotor is pre-calculated and mapped into the corresponding current commands for a magnetic bearing actuator (not shown). Command feedforward significantly reduces the hardware and/or software complexities associated with closed loop feedback control and eliminates the need for sensors.

Command feedforward will be subject to parameter variations and inaccuracies and will not generally match the force exactly. Hence residual forces, that can be maintained to very small levels, will be carried by the rotating element bearings. Even with the residual forces, the radial loading on the rotating element bearings can be reduced to almost zero (some loading remains and is desirable to ensure stability and conduction). Thus, vibration, noise, and wear is also reduced, and the operating speed can be increased. Because high performance dynamics are not needed for real time position control, controller 152 and any associated drive electronics can be greatly simplified and reduced in size.

According to another embodiment, closed loop force feedback control is used either instead of or in addition to the command feedforward techniques discussed above to control the load transmitted through the rotating element bearings to a prescribed level. In this embodiment, feedback force measuring devices 90 can be used in conjunction with a rotating mechanical bearing or can be integrated within a rotating mechanical bearing. The force measuring device may comprise a load cell or a strain gauge, for example, which can be positioned between an outer race and a support structure of a bearing (not shown). In one embodiment, at least two force measuring devices are positioned circumferentially around a bearing such that both orthogonal components of force can be detected and resolved. The sensed force can then be compared to a commanded value to generate an error signal. The error signal is then used to drive a current command to the magnetic bearings to correct the force error. When used in conjunction with command feedforward, this force feedback system can be used to compensate for errors in the command feedforward and control the residual force to a higher accuracy.

The magnetic bearing assembly of FIG. 2 results in magnetic field lines parallel to the rotating shaft axis. Advantageously, the hysteresis loss is smaller than the more common magnetic bearing with magnetic field lines perpendicular to the rotor axis due to non-reversing flux. The more common structure (wherein the electromagnets are rotated ninety degrees with respect to the orientation in FIG. 2) with magnetic field lines perpendicular to the rotating shaft axis can alternatively or additionally be used to provide magnetic relief with a possible reduction in the magnetic bearing axial lengths.

In the sectional view of FIG. 3, each magnetic bearing stator 139 includes one permanent magnet 144 and three electromagnets 142. As shown in FIG. 4, the structure can be further simplified by eliminating one of the electromagnets and separating the others by one hundred twenty degrees. The embodiment of FIG. 4 has the advantages of fewer electromagnets and control systems and associated drive systems having reduced size, complexity, and cost. The two electromagnets of FIG. 4 may require higher ratings than the three electromagnets of FIG. 3 to generate the same total force.

FIG. 5 is a sectional side view of an X-ray tube bearing assembly according to an example interior rotor/outer rotation embodiment of the present invention, and FIG. 6 is a sectional view taken along line A—A of FIG. 5.

If an X-ray tube is operating in a vertical position, then an axial force due to the weight of the anode assembly will be present. In this case, the magnetic bearings can relieve this weight from the rotating element bearings in order to extend the speed range. To provide the weight relief, in one embodiment, the magnetic bearing rotors are shifted with respect to the respective magnetic bearing stators so as to create an axial force when the respective electromagnetic windings are energized. Thus, the magnetic bearing motors can provide both radial and axial forces.

As shown in FIG. 5, it is useful to change the permanent magnet 240 positions in order for the permanent magnets to support most of the anode dead weight and to use the electromagnets primarily to counter the forces due to the tube operating trajectory. Thus, the permanent magnets are situated between the anode target and the motor rotor and the motor stator. Positioning the permanent magnets in this manner would situate the permanent magnets closest to the anode center of gravity and thus minimize potential movements. In one embodiment, the permanent magnets 240 are situated within the electromagnets 242 and the electromagnets provide a path for flux from both the permanent magnets and the electromagnet windings.

FIG. 5 additionally illustrates an interior rotor/outer rotation embodiment wherein the rotating element bearings 228 mechanically couple the rotor assembly and the stationary shaft which may comprise either a hollow or a solid structure. In this embodiment, the stationary shaft can optionally extend through the anode target and be attached to another stationary connector (not shown). For horizontally oriented interior rotor/outer rotation embodiments, an extended shaft is particularly useful to distribute the weight evenly and provide mechanical support.

Figure 7:
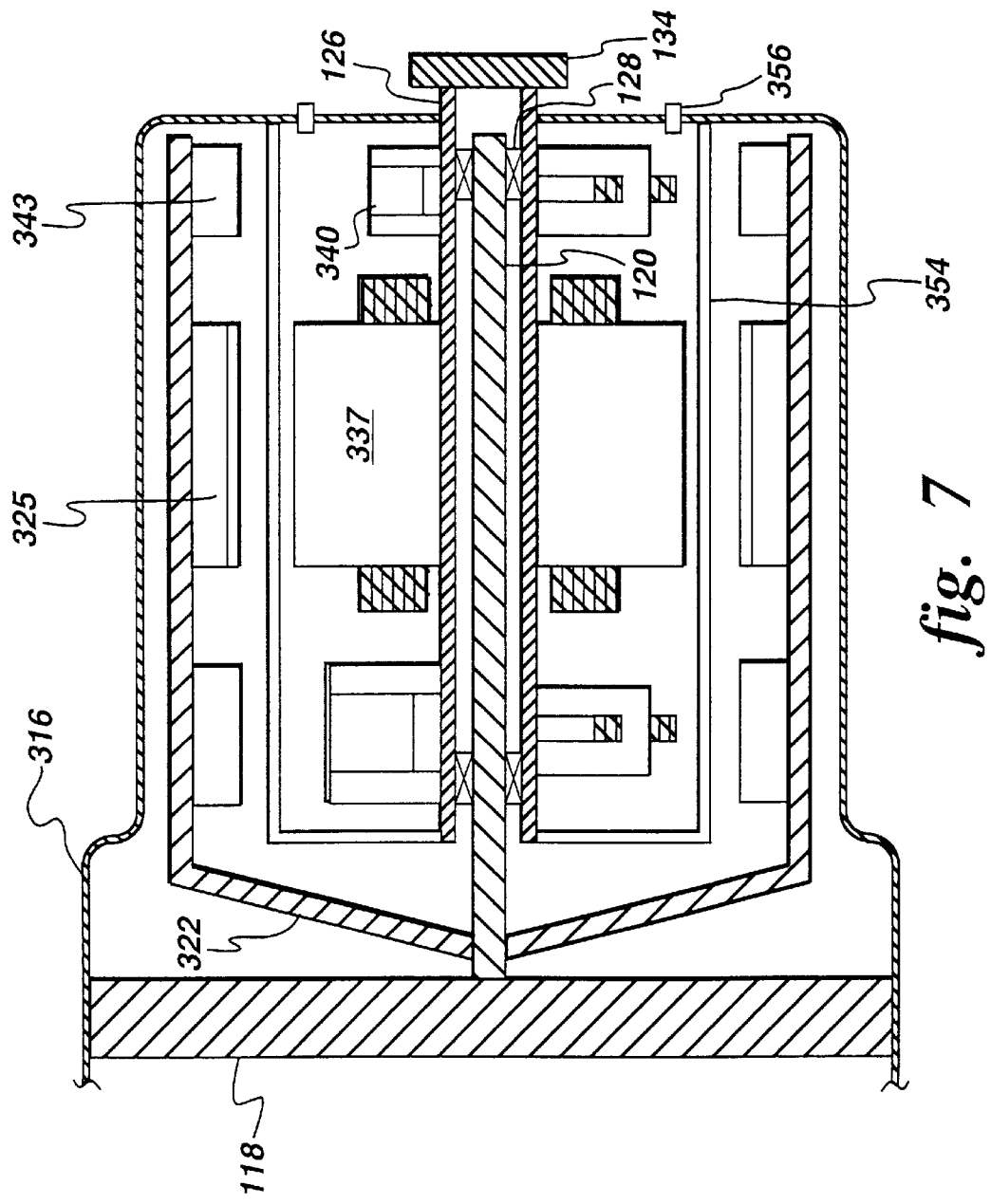
FIG. 7 is a sectional side view of an X-ray tube bearing assembly according to an example exterior rotor embodiment of the present invention.

FIG. 7 is a sectional side view of an X-ray tube bearing assembly according to an example exterior rotor embodiment of the present invention. In this embodiment, stator assembly 336 is situated between rotatable shaft 120 and rotor assembly 324. A useful position for the stator assembly, for example, is to be mounted on the stem (shown as stationary shaft 126).

For the exterior rotor embodiment of FIG. 7, unlike the embodiments of FIGS. 2 and 5, because the stator assembly is situated within frame 316, the motor rotor and the motor stator must be at the same electric potential. In one embodiment, the rotor assembly remains under vacuum conditions while the stator assembly is cooled with oil. In this embodiment, a shield 354 which surrounds the stator assembly can be attached to stationary stem 126 and to frame 316, and oil can be introduced to the stator assembly through oil inlets 356 while maintaining the rotor assembly in vacuum conditions.

Figure 8:
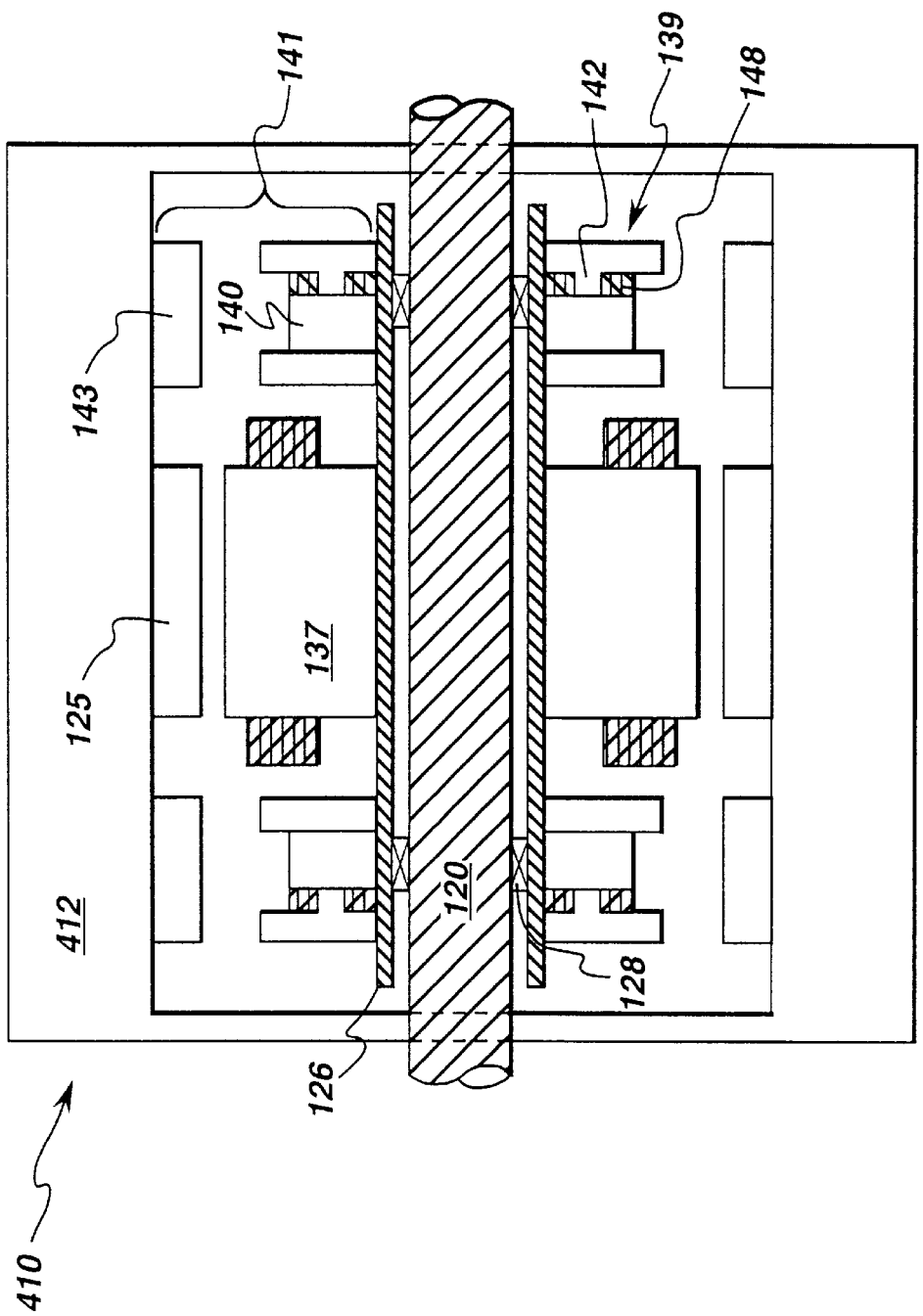
FIG. 8 is a sectional side view of a flywheel assembly.

Although, for purposes of example, the present invention was described above in the context of an X-ray tube bearing assembly, the invention can additionally be used in other embodiments that benefit from the existence of a bearing assembly including both rotating element and magnetic bearings. One such example, as shown in the sectional side view of FIG. 8, is a flywheel assembly 410 for energy storage systems. In flywheel-based energy storage systems, a single flywheel or an array of flywheels is run as fast as possible to maximize kinetic energy stored in the flywheels while simultaneously minimizing the bearing friction so as to minimize dissipated energy. In this environment, a bearing assembly including only rotating elements would dissipate a significant amount of energy, and a bearing assembly including only magnetic bearings would require complex and expensive control logic to provide complete five axis online control. Thus, combining the teachings of the present invention to flywheels would improve performance while minimizing energy dissipation, expense, and complexity.

In one embodiment, for example, a flywheel assembly 410 bearing assembly includes an axial rotatable structure 123 including a flywheel 412 and a cylindrical rotor assembly 124 (including a motor rotor 125 and a plurality of magnetic bearing rotors 143); a cylindrical stationary shaft 126; rotating element bearings 128 mechanically coupling the rotatable structure and the stationary shaft; and a cylindrical stator assembly 136 including a motor stator 137 and a plurality of magnetic bearing stators 139. The magnetic bearing stators and the magnetic bearing rotors forming magnetic bearings 141 which magnetically couple the rotor and stator assemblies. Like X-ray tubes, a flywheel can also be situated in a vacuum environment. Vacuum conditions reduce drag and thus reduce kinetic energy loss.

Although only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An X-ray tube bearing assembly comprising:
   an axial rotatable structure including an anode target and a cylindrical rotor assembly, the rotor assembly including a motor rotor and a plurality of magnetic bearing rotors;
   a cylindrical stationary shaft;
   rotating element bearings mechanically coupling the rotatable structure and the stationary shaft; and
   a cylindrical stator assembly including a motor stator and a plurality of magnetic bearing stators, the magnetic bearing stators and the magnetic bearing rotors forming magnetic bearings magnetically coupling the rotor and stator assemblies.

2. The assembly of claim 1 wherein the rotating element bearings and the magnetic bearings are each situated on opposing ends of the motor rotor and the motor stator.

3. The assembly of claim 2 wherein at least one of the magnetic bearing stators includes a permanent magnet, and wherein at least two of the magnetic bearing stators include at least two electromagnets having electromagnetic windings, and wherein the at least two of the magnetic bearing stators are situated on opposing ends of the motor stator.

4. The assembly of claim 3 further including a controller for providing command feedforward of electrical current in the electromagnetic windings to achieve appropriate radial forces for respective X-ray tube operating trajectories.

5. The assembly of claim 3 wherein the magnetic bearing rotors comprise at least two magnetic cylinders situated on opposing ends of the motor rotor.

6. The assembly of claim 5 wherein the magnetic bearing rotors have axial lengths substantially equivalent to axial lengths of respective magnetic bearing stators.

7. The assembly of claim 6 wherein the magnetic bearing rotors are shifted with respect to the respective magnetic bearing stators so as to create an axial force when the respective electromagnetic windings are energized.

8. The assembly of claim 3 wherein at least two of the magnetic bearing stators include permanent magnets.

9. The assembly of claim 8 wherein the permanent magnets are situated on magnetic bearing stators on opposing ends of the motor stator and wherein a front permanent magnet situated closer to the anode target is larger than a rear permanent magnet situated farther from the anode target.

10. The assembly of claim 3 wherein a plurality of permanent magnets are situated on the magnetic bearing stator between the anode target and the motor stator.

11. The assembly of claim 10 wherein the permanent magnets are situated within the electromagnets.

12. The assembly of claim 1, wherein
   the rotatable structure further includes a rotatable shaft with the anode target, and the rotor assembly attached thereto, the rotor assembly extending around a portion of the rotatable shaft, the stationary shaft is situated between the rotatable shaft and the rotor assembly, and the rotating element bearings mechanically couple the rotatable shaft and the stationary shaft.

13. The assembly of claim 12 wherein the stator assembly extends around at least a portion of the rotor assembly.

14. The assembly of claim 13 further including an X-ray tube frame situated between the stator and rotor assemblies.

15. The assembly of claim 14 wherein the stator assembly is mounted on the X-ray tube frame.

16. The assembly of claim 12 wherein the stator assembly is situated between the rotatable shaft and the rotor assembly.

17. The assembly of claim 16 wherein the stator assembly is mounted on the stationary shaft.

18. The assembly of claim 1, wherein the rotating element bearings mechanically couple the rotor assembly and the stationary shaft.

19. A bearing assembly comprising:
   an axial rotatable structure including a cylindrical rotor assembly, the rotor assembly including a motor rotor and a plurality of magnetic bearing rotors;
   a cylindrical stationary shaft;
   rotating element bearings mechanically coupling the rotatable structure and the stationary shaft; and
   a cylindrical stator assembly including a motor stator and a plurality of magnetic bearing stators, the magnetic bearing stators and the magnetic bearing rotors forming magnetic bearings magnetically coupling the rotor and stator assemblies.

20. The assembly of claim 19 wherein the rotating element bearings and the magnetic bearings are each situated on opposing ends of the motor rotor and the motor stator.

21. The assembly of claim 20 wherein at least one of the magnetic bearing stators includes a permanent magnet, and wherein at least two of the magnetic bearing stators include at least two electromagnets having electromagnetic windings, and wherein the at least two of the magnetic bearing stators are situated on opposing ends of the motor stator.

22. The assembly of claim 21 further including a controller for providing command feedforward of electrical current in the electromagnetic windings to achieve appropriate radial forces.

23. The assembly of claim 19, wherein
   the rotatable structure further includes a rotatable shaft with the rotor assembly attached thereto, the rotor assembly extending around a portion of the rotatable shaft, the stationary shaft is situated between the rotatable shaft and the rotor assembly, and the rotating element bearings mechanically couple the rotatable shaft and the stationary shaft.

24. The assembly of claim 23 wherein the stator assembly extends around at least a portion of the rotor assembly.

25. The assembly of claim 23 wherein the stator assembly is situated between the rotatable shaft and the rotor assembly.

26. The assembly of claim 25 wherein the stator assembly is mounted on the stationary shaft.

27. The assembly of claim 19, wherein the rotating element bearings mechanically couple the rotor assembly and the stationary shaft.

28. A flywheel assembly bearing assembly comprising:

an axial rotatable structure including a flywheel), a cylindrical rotor assembly, the rotor assembly including a motor rotor and a plurality of magnetic bearing rotors;

a cylindrical stationary shaft;

rotating element bearings mechanically coupling the rotatable structure and the stationary shaft; and a cylindrical stator assembly including a motor stator and a plurality of magnetic bearing stators the magnetic bearing stators and the magnetic bearing rotors forming magnetic bearings magnetically coupling the rotor and stator assemblies.

29. The assembly of claim 19 wherein the rotating element bearings and the magnetic bearings are each situated on opposing ends of the motor rotor and the motor stator.

30. The assembly of claim 29 wherein at least one of the magnetic bearing stators includes a permanent magnet, and wherein at least two of the magnetic bearing stators include at least two electromagnets having electromagnetic windings, and wherein the at least two of the magnetic bearing stators are situated on opposing ends of the motor stator.

31. The assembly of claim 30 further including a controller for providing command feedforward of electrical current in the electromagnetic windings to achieve appropriate radial forces.

* * * * *